UNITED STATES PATENT OFFICE.

BENJAMIN A. PEACOCK, OF PHILADELPHIA, PENNSYLVANIA, ASSIGNOR TO ROBERT GILCHRIST, OF NEW YORK, N. Y.

PROCESS OF PRODUCING POTASSIUM HYDRATE FROM GREEN SAND.

1,309,744.

Specification of Letters Patent.  Patented July 15, 1919.

No Drawing.   Application filed August 3, 1918.   Serial No. 248,145.

*To all whom it may concern:*

Be it known that I, BENJAMIN A. PEACOCK, a citizen of the United States, residing at Philadelphia, in the county of Philadelphia and State of Pennsylvania, have invented certain new and useful Improvements in Processes of Producing Potassium Hydrate from Green Sand; and I do hereby declare the following to be a full, clear, and exact description of the invention, such as will enable others skilled in the art to which it appertains to make and use the same.

This invention relates to a dry process of producing potassium hydrate from green sand as well as from potassium bearing silicates of the nature of feldspar, and has for its object to improve the procedures heretofore proposed.

With this and other objects in view the invention consists in the novel steps and combinations of steps constituting the process, all as will be more fully hereinafter disclosed and particularly pointed out in the claims.

In order that the precise invention may be the more clearly understood, it is said:—

Potassium zeolites have a composition which may be approximately indicated by the following formula—

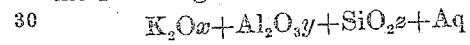
$$K_2O x + Al_2O_3 y + SiO_2 z + Aq$$

and it is well known that most of them are very slightly soluble in water. That is to say, water will only dissolve about one or two per cent. of such zeolites. On the other hand, if calcium hydroxid is added to such a solution of these zeolites, a double decomposition occurs between that portion of the zeolite which is soluble in water, and that portion of the calcium hydroxid which is soluble in water, to the end that a water insoluble calcium zeolite is formed and potassium hydrate KOH is set free in the solution.

As this reaction removes the soluble portion of the potassium zeolite another portion immediately goes into solution, and this in turn is decomposed by the calcium hydroxid present.

The reaction will continue if there is sufficient calcium hydroxid present until all of the potassium zeolite is decomposed and is changed into an insoluble calcium zeolite. Of course, the formation of this said calcium zeolite in the meantime causes substantially all the potassium hydrate present to appear in a soluble form. In carrying out this invention I take a mineral such as glauconite or feldspar and heat it for a short time in the presence of potassium hydrate or potassium carbonate, whereupon I find a very considerable proportion of the total potassium present appears in the form of a potassium zeolite which is very slightly soluble in water.

After the mixture of glauconite and the potassium bearing salt has been thus heated and the potassium zeolite thus produced, I then add to the product calcium hydrate and water and boil the mixture for say about one hour at atmospheric pressure and with agitation whereupon the above double decomposition takes place and the potassium present appears in the form of a crude hydrate which may be recovered by filtering out the insoluble residue. The economy of the process resides largely in the saving of time and the cost of apparatus.

In other words, the heating of the glauconite and potassium carbonate or potassium hydrate can be effected in an inexpensive furnace and in a very short time, say fifteen or thirty minutes, and especially since the temperature need not be raised higher than that of fusion of the mixture.

The boiling of the zeolite thus produced with calcium hydrate can be carried out in a simple pot open to the atmosphere, and it need not require more than an hour, and it can further be carried out while the mass is still hot, from the heat derived from the furnace, thus saving the expense of reheating the same.

It is obvious that those skilled in the art may vary the details of the process without departing from the spirit of the invention, and therefore, I do not wish to be limited in the above disclosure except as may be required by the claims.

What I claim is:—

1. The process of producing a crude potassium hydrate from glauconite which consists in heating said glauconite with potassium hydrate to form a potassium zeolite; adding to the zeolite thus produced calcium hydrate and water; boiling the mixture to dissolve out the combined potassium present; and separating out the crude potassium hydroxid thus produced, substantially as described.

2. The process of extracting the combined potassium carried by naturally occurring potassium bearing silicates which consists in converting said silicates into the form of potassium zeolites; adding to said zeolites calcium hydrate and water; boiling the mixture thus produced in a finely divided condition until substantially all the potassium present has been converted into a crude hydrate; and separating out said hydrate, substantially as described.

In testimony whereof I affix my signature, in presence of two witnesses.

BENJAMIN A. PEACOCK.

Witnesses:
 LOUIS S. HEIDIG, Jr.,
 MARGARET M. SENETT.